(12) United States Patent
Greven

(10) Patent No.: US 6,623,832 B2
(45) Date of Patent: *Sep. 23, 2003

(54) SEALING STRIPS

(75) Inventor: Helmut Greven, Viersen (DE)

(73) Assignee: GenCorp Property, Inc., Rancho Cordova, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 22 days.

(21) Appl. No.: 09/445,703

(22) PCT Filed: Jun. 4, 1998

(86) PCT No.: PCT/GB98/01648
§ 371 (c)(1),
(2), (4) Date: Feb. 15, 2000

(87) PCT Pub. No.: WO99/04997
PCT Pub. Date: Feb. 4, 1999

(65) Prior Publication Data
US 2002/0106484 A1 Aug. 8, 2002

(30) Foreign Application Priority Data
Jul. 25, 1997 (GB) ................................. 9715773

(51) Int. Cl.⁷ .............. B32B 3/04; E06B 3/62; F16J 15/02
(52) U.S. Cl. ............... 428/121; 428/122; 277/641; 277/642; 277/645; 277/647; 277/651; 277/652; 277/921; 49/490.1
(58) Field of Search .................. 428/121, 122; 277/642, 645, 651, 921, 641, 647, 652; 49/490.1

(56) References Cited

U.S. PATENT DOCUMENTS

| | | | | |
|---|---|---|---|---|
| 4,343,121 A | * | 8/1982 | Kruschwitz et al. | 52/208 |
| 4,542,610 A | | 9/1985 | Weimar | 49/491 |
| 4,749,203 A | * | 6/1988 | Bright | 277/642 |
| 5,029,381 A | | 7/1991 | St. Angelo, Jr. et al. | 29/701 |
| 5,067,225 A | | 11/1991 | St. Angelo, Jr. et al. | 29/451 |
| 5,249,353 A | | 10/1993 | Kranz | 29/446 |

FOREIGN PATENT DOCUMENTS

| | | |
|---|---|---|
| DE | 4 027 191 | 3/1992 |
| EP | 0 425 083 | 5/1991 |
| EP | 0 723 891 | 7/1996 |
| FR | 2 709 451 | 3/1995 |
| FR | 2 711 950 | 5/1995 |
| GB | 2 099 489 | 12/1982 |
| GB | 2 200 390 | 8/1988 |

* cited by examiner

Primary Examiner—Michael Barr
Assistant Examiner—Elena Tsoy
(74) Attorney, Agent, or Firm—Leydig, Voit & Mayer, Ltd.

(57) ABSTRACT

A sealing strip, such as for fitting to the frame of a door opening in a motor vehicle body, comprises a longitudinally extending channel-shaped mounting portion incorporating a channel-shaped reinforcing carrier. The hollow tubular longitudinally extending sealing portion is attached to the outside of the mounting portion. When such a strip is bent to follow curves in the door frame, the increased tension in the mounting portion at the curves can cause the sealing portion to move inwardly of the curve so as partially the bridge across the curve. In order to avoid this, the sealing strip, and particularly the mounting portion are longitudinally compressed at positions corresponding to the positions where curves are to be formed in the strip. This local longitudinal compression helps to maintain the sealing portion in its correct attitude.

14 Claims, 2 Drawing Sheets

SEALING STRIPS

CROSS-REFERENCES TO RELATED APPLICATIONS

Not applicable.

STATEMENT REGARDING FEDERALLY SPONSORED RESEARCH FOR DEVELOPMENT

Not applicable.

BACKGROUND OF THE INVENTION

1. Field of the Invention

The invention relates to a longitudinally extending sealing strip for providing a seal between the surround of an opening and a closure member for the opening, the sealing strip comprising a longitudinally extending mounting portion incorporating resilient reinforcement means, and a longitudinally extending sealing portion on the mounting portion, the mounting portion and the resilient reinforcement means being locally stressed lengthwise at a position or positions corresponding to bends or curves in the surround. The invention also relates to a method of making a longitudinally extending sealing strip for providing a seal between the surround of an opening and a closure member for the opening, the sealing strip comprising a longitudinally extending mounting portion incorporating resilient reinforcement means, and a longitudinally extending sealing portion on the mounting portion, the method including the step of locally stressing the mounting portion and the resilient reinforcement means lengthwise at a position or positions corresponding to bends or curves in the surround.

2. Description of the Related Art Including Information Disclosed Under 35 C.F.R. 1.97 and 1.98.

Such a sealing strip and such a method are known from U.S. Pat. No. 5,249,353. In this known strip and method, the strip is locally stretched lengthwise at the said position or positions. Therefore, when the strip is bent to follow a bend or curve, the resultant lengthwise compression of the sealing portion tends to return the stress therein towards the original value (before the initial tension), with the aim of avoiding "buckling" of the sealing portion. However, the success of this process depends on the extent to which the initial tension matches the subsequent compression.

According to the invention, the sealing strip as first set forth above is characterised in that the mounting portion and the resilient reinforcement means are locally stressed lengthwise by being locally compressed lengthwise at the said position or positions.

U.S. Pat. No. 4,343,121 (Kruschwitz et al) shows an arrangement in which a longitudinal window glass mounting arrangement for a vehicle is compressed while it is being mounted on a window surround so as to be held compressed thus allowing the window glass to "float" slightly in the mounting arrangement, the mounting arrangement being compressed throughout its length.

BRIEF SUMMARY OF THE INVENTION

According to the invention, also, the method as first set forth above is characterised in that the lengthwise locally stressing step comprises the step of locally compressing the mounting portion and the resilient reinforcement means lengthwise at the said position or positions.

The local compression of the mounting portion and the resilient reinforcement means has the effect of shifting the neutral bending axis of the strip towards the inside of the bends or curves, reducing the tendency of the sealing portion to buckle and helping to ensure that the sealing portion maintains the correct positional relationship with the mounting portion.

BRIEF DESCRIPTION OF THE SEVERAL VIEWS OF THE DRAWINGS

Sealing strips embodying the invention, and methods according to the invention of making sealing strips, will now be described, by way of example only, with reference to the accompanying diagrammatic drawings in which.

DETAILED DESCRIPTION OF THE INVENTION

Figure 1:
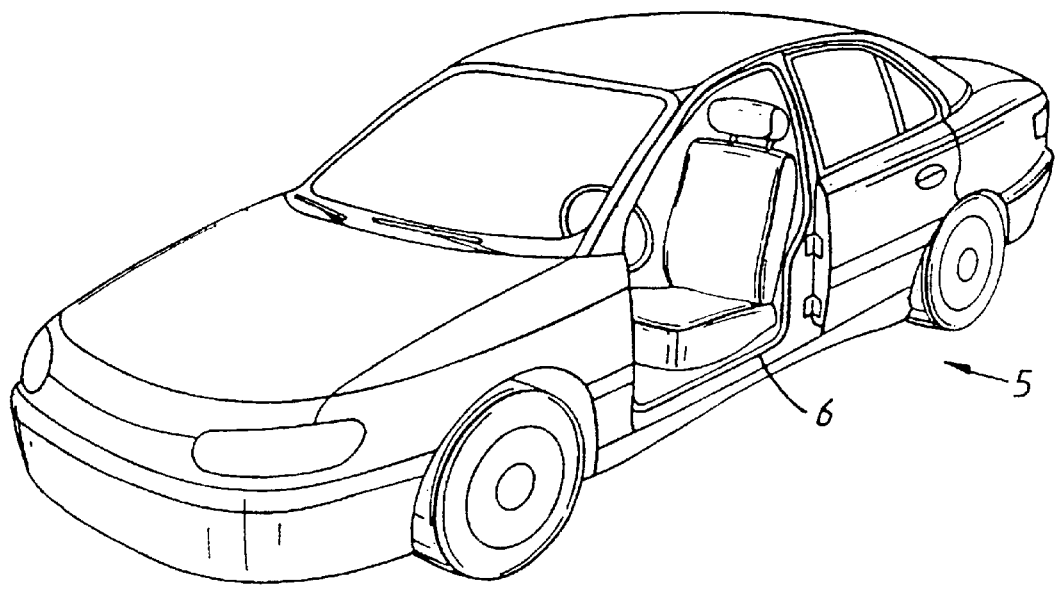
FIG. 1 is a perspective view of a motor vehicle body with one of its doors removed to show where one of the sealing strips may be fitted.

As shown in FIG. 1, a motor vehicle 5 has the driver's door removed to show a sealing strip 6 mounted on the frame running around the door opening.

Figure 2:
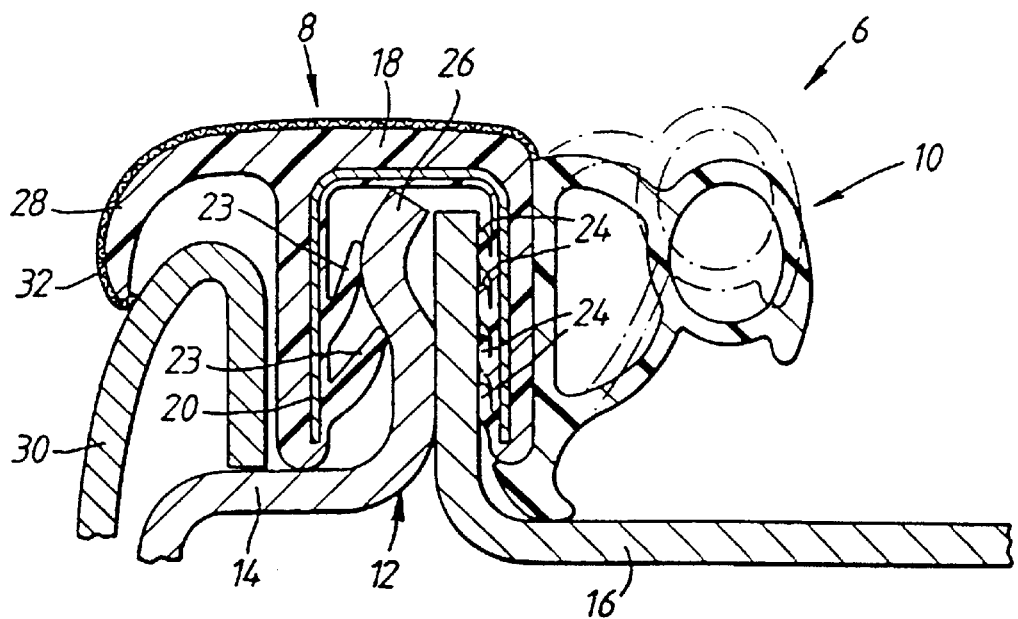
FIG. 2 is a cross-section through one of the sealing strips, showing it mounted in position.
Figure 3:
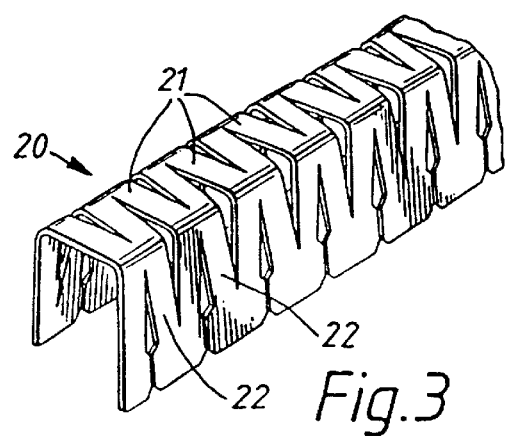
FIG. 3 is a perspective view of a reinforcing carrier which can be used in the strip of FIG. 2.

The sealing strip 6 is shown in more detail in FIG. 2. It comprises two parts: a gripping or mounting portion 8 and a sealing portion 10. The gripping portion 8 is of channel-shape in cross-section and embracingly grips a mounting flange 12 which forms the frame of the door opening. The flange 12 is formed where inner and outer body panels 14, 16 come together at the door opening and are spot-welded (for example) together to form the flange. The gripping portion 8 comprises extruded plastics or rubber material 18 in which is embedded a reinforcing core or carrier 20 of resilient material such as metal. One form which the carrier 20 can take is shown in FIG. 3. As there shown, it may be formed of (inverted) U-shaped elements 21 connected together by integral connecting links 22. Instead the elements 21 may be entirely disconnected. In another example, the carrier may be made of wire looped to and fro. Other forms of carrier are possible. The carrier need not be made of metal. The carrier may be incorporated into the extruded material 18 by means of a cross-head extruder.

The extruded material 18 has integral gripping lips 23, 24 on opposite inside faces of the channel. As shown in FIG. 2, the lips made contact with the opposite outer faces of the flange 12. They, together with the resilience given to the mounting gripping portion 8 by the resilient carrier 20, ensure that the gripping portion 8 firmly embraces the flange. Advantageously, the lips 23, 24 are extruded from material which is softer than the remainder of the material 18, so as to increase their frictional grip on the flange. In addition, and as shown in FIG. 2, one of the body panels 14 forming the flange 12 may be given an outwardly directed bend 26 which helps to secure the gripping portion 8 in position.

The gripping portion 8 is in this example extended to form a so-called "cosmetic" lip 28 which in use embraces the edge of a body trim panel 30 so as to hide the edge and help to secure the panel in position.

The sealing portion 10 is of longitudinal tubular form and is secured to the outside of one channel side wall of the mounting portion 8. The sealing portion 10 may be made of extruded soft rubber or plastics material or from a thermoplastic elastomer. Advantageously, it is of foamed or cellular construction to increase its softness. In the form shown in FIG. 2, it is extruded to be of bi-tubular form. However, other forms are possible. The sealing portion 10 may be extruded separately and then secured to the outside channel side wall by means of an adhesive. Instead, though, it may be integrally extruded with the material 18.

The outside of the gripping portion 8 may be covered in fabric 32 for decorative purposes.

In use, the mounting portion 8 mounts the sealing strip around the door surround so that the sealing portion 10 faces outwardly of the door opening and becomes partly compressed by the closing door. In this way, it produces a weather-tight seal.

Figure 4:
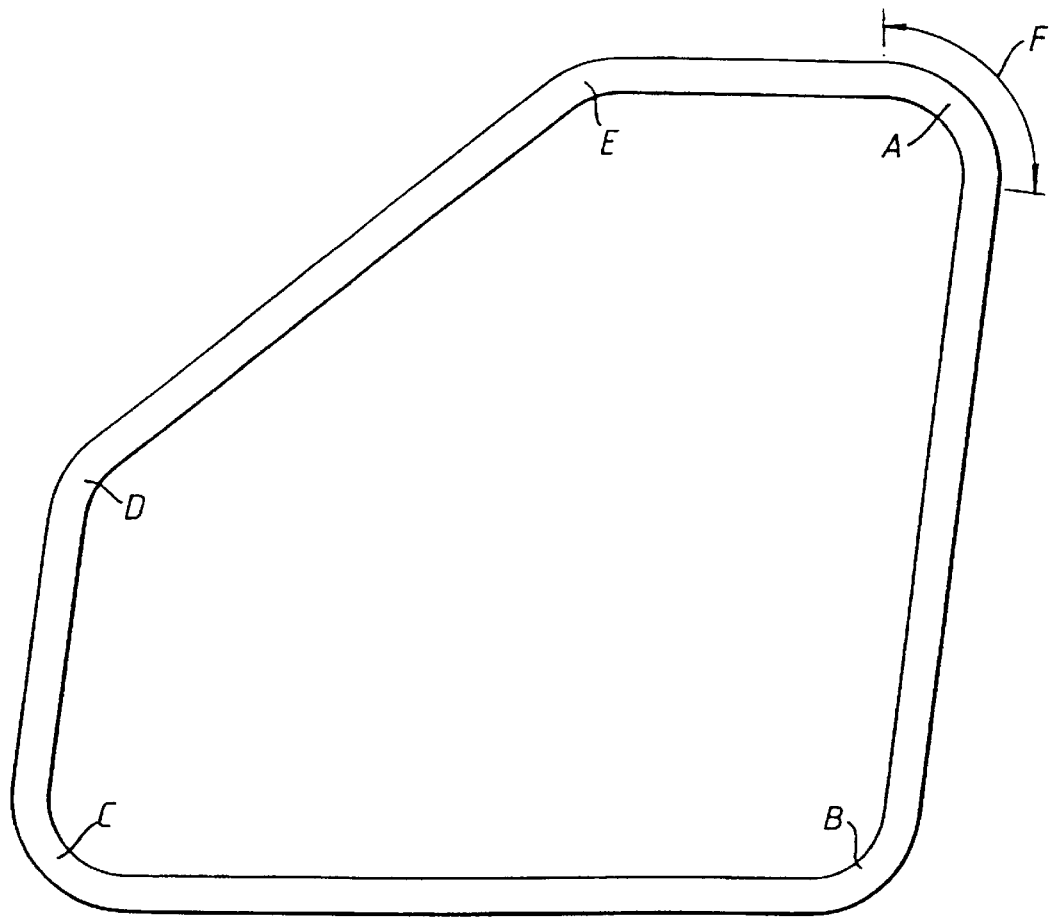
FIG. 4 is a side view showing one of the strips arranged in continuous loop form for mounting around the frame of the drawer opening.

Advantageously, the strip 6 is, after manufacture, formed into a continuous loop as shown in FIG. 4, matching the shape and size of the door opening and arranged with pre-formed curves A, B, C, D and E to match the curves in the door opening; the strip is, however, sufficiently flexible to enable it to be mounted in position on the door surround.

In accordance with a feature of the invention, the sealing strip is compressed lengthwise over short portions of its length which correspond to the positions where the curves A, B, C, D and E (FIG. 4) are to be formed, this lengthwise compression being carried out while the strip is still in straight form. As shown in FIG. 4, for curve A, the strip is compressed lengthwise over the region F (before bending). This compression may be carried out by passing the strip through a set of spaced pairs of rollers which can be controlled to run at different rotational speeds. As the strip passes longitudinally through the pairs of rollers, the pairs of rollers are normally controlled to run at the same speed so as to have no effect on the strip but are programmed to run at different speeds temporarily as the strip passes through them, so as to apply longitudinal compression to the relevant parts of the length of the strip.

The effect of this local compression is to ensure that the sealing portion 10 (FIG. 2) maintains its correct attitude at the curves. FIG. 2 shows, in dotted form, the attitude which the sealing portion 10 tends to take, with respect to the gripping portion 8, at the curves in the continuous loop of FIG. 4 if the sealing strip is not longitudinally compressed at such a curve. In this case, tension in the channel side walls of the mounting portion 8 causes the sealing portion 10 to tend to assume the dotted position shown in FIG. 2 when the strip is bent to follow the desired curve. However, if compression is locally applied lengthwise to the sealing strip, and particularly to its carrier, in the region of the curves, it is found that the attitude of the sealing portion 10 does not significantly change at the curves and thus maintains the full-line position shown in FIG. 2. More specifically, the local compression of the strip compresses the carrier 20 lengthwise, partially closing the gaps between the elements 21 (see FIG. 3), particularly along the inverted base of the channel. This has the effect of shifting the neutral bending axis of the strip more closely to the plane of the inverted channel base. In other words, when the strip is bent to follow the curves A, B, C, D and E (FIG. 4), with the open mouth of the channel of the mounting portion on the outside of each curve, the neutral bending axis (the line along which the material of the strip is neither compressed nor tensioned at the curves) lies more closely to the inside of the curves, thus holding the sealing portion 10 in the correct attitude and reducing any tendency for it to buckle or wrinkle at the curves.

Where sharp curves are required in sealing strips, tending to cause significant distortion of the sealing portion, it is known to cut a section out of the sealing portion and to produce a moulded insert matched to the sharp corner. However, it is found that local compression of the sealing strip in the manner described above can obviate the need for such a moulded insert, enabling a sharp curve to be produced simply by bending the sealing strip.

It is not necessary for the strip to be formed into a closed loop (as shown in FIG. 4). It may be formed into an open loop or left in the straight form. In the latter case, though, it is necessary to be able to locate the positions along the strip where the local compression has taken place.

What is claimed is:

1. A longitudinally extending sealing strip for providing a seal between a surround of an opening and a closure member for the opening, wherein the surround comprises at least one curve or bend, the sealing strip being substantially straight in a free state and comprising:

a longitudinally extending mounting portion for mounting the strip located in relation to the surround, and a longitudinally extending sealing portion on the mounting portion, the mounting portion having a lengthwise compressed local region in said free state situated at at least one position in said sealing strip, said compressed local region of the mounting portion being adapted to be disposed adjacent said bend or curve in the surround, said mounting portion elsewhere comprising at least one substantially uncompressed length in the free state, the mounting portion incorporating longitudinally extending reinforcement means which also has a lengthwise compressed local region in the free state, the compressed local region of the reinforcement means being positioned to correspond with said compressed local region of the mounting portion to hold the mounting portion locally compressed lengthwise at said compressed local region of the mounting portion, the reinforcement means elsewhere comprising at least one substantially uncompressed length in the free state, the mounting portion being substantially straight in the free state, such that the strip may be subsequently formed into said bend or curve at the compressed local regions of the mounting portion and the reinforcement means, whereby there is reduced distortion of the sealing portion at said bend or curve.

2. A strip according to claim 1, further comprising a neutral axis of bending, and in which the local lengthwise compression shifts the neutral axis of the bending towards a position corresponding to the inside of the bends or curves.

3. A strip according to claim 1, in which the mounting portion is channel-shaped for gripping a flange or the like forming the round of the opening.

4. A strip according to claim 3, in which the reinforcement means comprises a channel-shaped metal carrier.

5. A strip according to claim 4, wherein the channel-shaped metal carrier comprises a base, at least the base of the channel-shaped carrier comprising slots which are at least partially closed in the compressed local region of the reinforcement means.

6. A strip according to claim 1, in which the sealing portion is of hollow tubular form.

7. A strip according to claim 3, wherein the channel-shaped mounting portion comprises at least one outside wall and in which the sealing portion is of hollow tubular form and mounted on said one outside side wall of the channel-shaped mounting portion.

8. A strip according to claim 1, in which the mounting portion comprises extruded plastics or rubber material.

9. A strip according to claim 1, in which the sealing portion comprises extruded rubber or plastics material.

10. A method of making a longitudinally extending sealing strip for providing a seal between a surround of an opening and a closure member for the opening, the surround having at least one bend or curve, the sealing strip comprising a longitudinally extending mounting portion for mounting the strip located in relation to the surround and a longitudinally extending sealing portion on the mounting portion, the mounting portion having longitudinal reinforcing means incorporated therein, the method including the steps of locally compressing the mounting portion lengthwise in a region situated at at least one position corresponding to a bend or curve in the surround while the strip is substantially straight and before the strip is mounted on the surround such that the mounting portion in said region remains substantially compressed in a free state, the mounting portion being otherwise substantially uncompressed longitudinally in said free state, simultaneously locally and lengthwise compressing the reinforcement means in a region corresponding to said region of the mounting portion, such that said region of the reinforcement means remains substantially compressed in the free state, and being elsewhere substantially uncompressed lengthwise in the free state, such that the strip at said regions may be subsequently formed into said bend or curve whereby the local lengthwise compression in said regions reduces distortion of the sealing portion.

11. A method according to claim 10, wherein the strip comprises a neutral axis of bending, and in which the local lengthwise compression shifts the neutral axis of bending towards a position corresponding to the inside of the bends or curves.

12. A method according to claim 11, in which the resilient reinforcement means is channel-shaped metal having a base having slots which become at lent partially closed by the local compression.

13. A method according to claim 10, including the step of forming the sealing strip into a loop matching the size and shape of the surround.

14. A method according to claim 13, which the loop is a closed loop.

* * * * *